Dec. 3, 1963 H. W. LEHMAN ETAL 3,113,266
CIRCUIT FOR DETERMINING LOCATION OF A BREAK IN A CABLE
HAVING SEQUENTIALLY OPERATED PULSE GENERATING
MEANS SPACED ALONG SAID CABLE
Filed Nov. 9, 1961 3 Sheets-Sheet 1
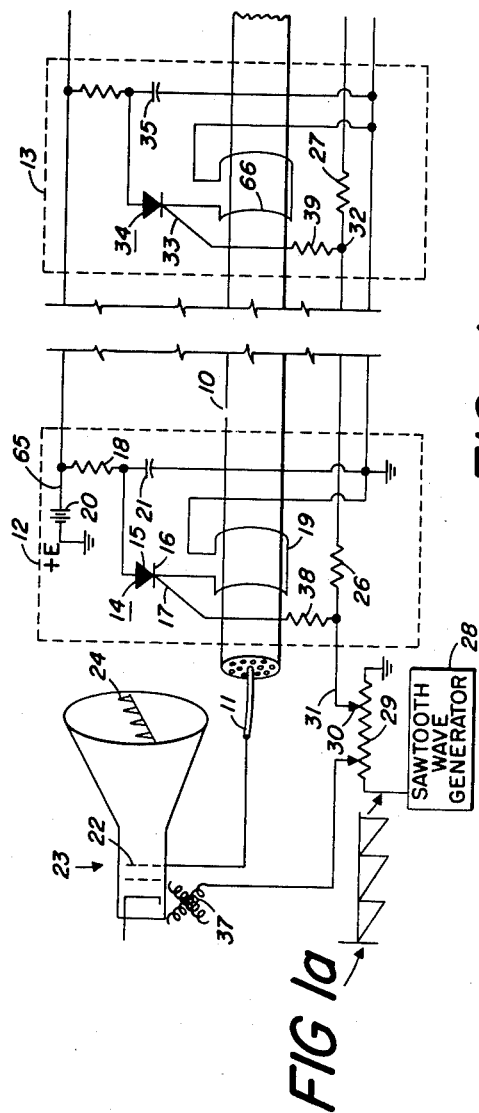
INVENTORS
JAMES E. FANKHAUSER
HARRY W. LEHMAN
BY
*Moody and Phillion*
ATTORNEYS Dec. 3, 1963  H. W. LEHMAN ETAL  3,113,266
CIRCUIT FOR DETERMINING LOCATION OF A BREAK IN A CABLE
HAVING SEQUENTIALLY OPERATED PULSE GENERATING
MEANS SPACED ALONG SAID CABLE
Filed Nov. 9, 1961
3 Sheets-Sheet 2

INVENTORS
JAMES E. FANKHAUSER
HARRY W. LEHMAN
BY
ATTORNEYS

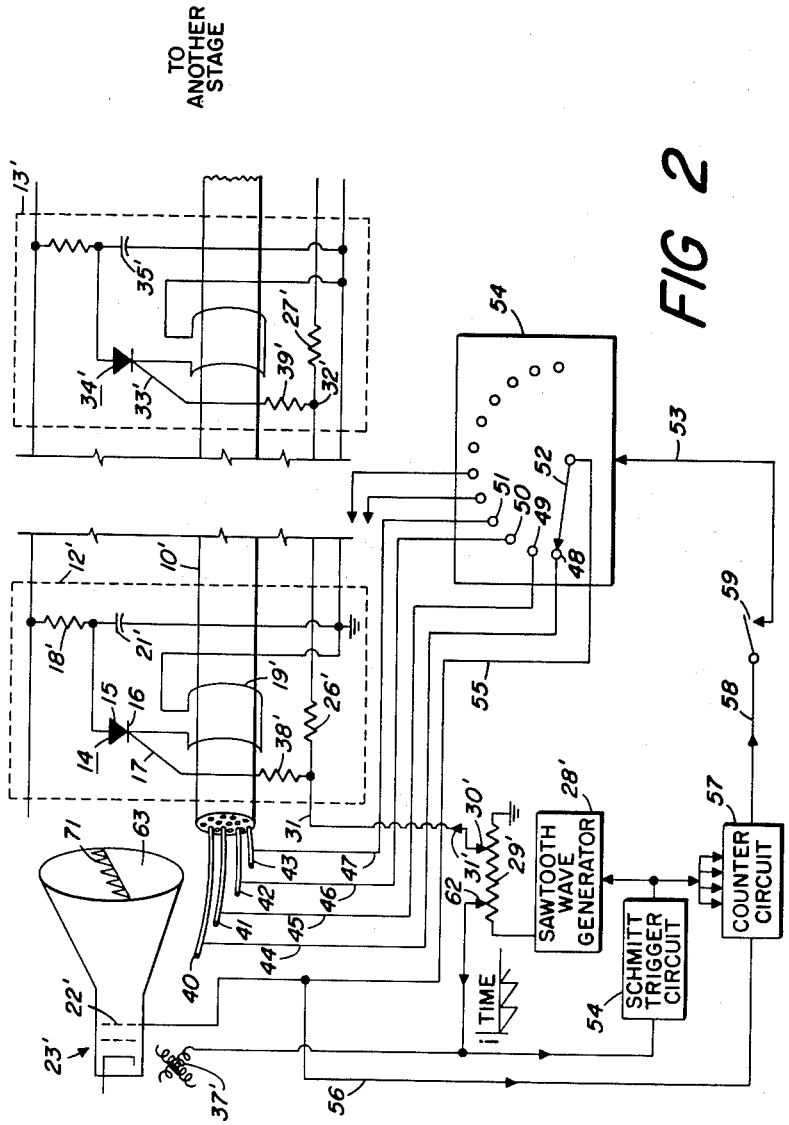

United States Patent Office 3,113,266
Patented Dec. 3, 1963

3,113,266
CIRCUIT FOR DETERMINING LOCATION OF A BREAK IN A CABLE HAVING SEQUENTIALLY OPERATED PULSE GENERATING MEANS SPACED ALONG SAID CABLE
Harry W. Lehman, Philadelphia, Pa., and James E. Fankhauser, Cedar Rapids, Iowa, assignors to Collins Radio Company, Cedar Rapids, Iowa, a corporation of Iowa
Filed Nov. 9, 1961, Ser. No. 151,341
8 Claims. (Cl. 324—52)

This invention relates generally to apparatus for locating breaks in conductors and, more specifically, to apparatus for determining the location of breaks in cables within tolerances of the order of a foot without employing expensive repeater stations and without the use of echoes produced by reflected signals.

In the prior art there are many systems for determining the location of a break in a conductor. Generally speaking, these systems can be broken down into two general categories. The first of these categories employs echoes; that is to say, a signal is transmitted down the line and a reflection occurs at the point of breakage. The time interval elapsing between the transmission and the reception of the echo is determinative of the distance of the point of breakage from the transmission point.

In the second general category repeater stations are employed. More specifically, a signal is transmitted down the line and triggers a signal in each of several repeater stations which are stationed at various points along the transmission line. The repeater station just before the break will, of course, be the last repeater station to transmit a signal back to the testing point. The point of breakage will be between said last repeater station and the next farthest repeater station down the line.

In long transmission lines the use of the reflected signal to determine the point of breakage has been found to be quite suitable. On the other hand, however, over relatively sort distances, such as may be found in the cables employed in a radio or television transmitting station, the use of echoes to check the cable running from the transmitting equipment to the monitor has been found to lack practicality. The use of repeater stations in connection with both long lines and relatively short cables has been found to be expensive. It would mark a definite improvement in the art to provide a relatively inexpensive and reliable means for detecting breaks in relatively short cables such as the type cables employed in television transmitting stations.

An additional problem which arises when detecting breaks in cables is the detection of which particular conductor of a multiconductor cable is open-circuited. There are in the prior art many devices for determining which of the conductors is open-circuited. Most of these structures are complex but generally function to trace each of the conductors on an individual basis.

In the present invention a means for determining which conductor has the break therein has been developed, which functions cooperatively with the means for determining the location of the break.

It is an object of the invention to provide a means for detecting breaks in the individual conductors of relatively short cable connections, such as the type cables employed in television transmitting stations.

A further object of the invention is to provide a simple and inexpensive means for locating a break in a conductor of any length.

A third purpose of the invention is a relatively simple and inexpensive means for locating which conductor of a group of conductors in a cable has a break therein and for locating the point of breakage.

A fourth object of the invention is the improvement, generally, of structures for locating breaks in conductors.

In accordance with the invention there is provided in combination with the cable to be tested, a plurality of controled switching circuits positioned at spaced intervals along the cable. Each of said controlled switching circuits comprises a series combination of a current limiting resistor, a controlled switch, and an inductive coil wound around the conductors of said cable. Such series combination is connected across a D.C. voltage supply which is common to all of said controlled switching circuits. A capacitor is connected across the controlled switch and the inductive coil of each switching circuit. Each controlled switch has a control electrode which is constructed to be responsive to a signal supplied thereto from a station at the end of the cable to cause said controlled switch to become conductive, thus creating a discharge path therethrough for the charge on said capacitor; said discharge path including said controlled switch and the aforementioned coil wound around said cable. Upon said discharge a pulse will be induced in each of the conductors within said cable. Means are provided to sequentially trigger the control switches spaced along said cable. Such means consist of a series of resistors forming a long potential divider which extends along the length of the cable. Each of the control electrodes of each controlled switch is connected at spaced electrical intervals along said potential divider. Means are then provided to supply a saw-tooth shaped signal to said triggering means, thus causing the controlled switch nearest the saw-tooth generator to become conductive first and then the succeeding controlled switches become conductive in a sequential manner along the cable. It is to be noted that a surge of current will occur through each controlled switch when triggered, even in the absence of the aforementioned capacitor due directly to action of said D.C. voltage supply.

As each controlled switch becomes conductive and permits a surge of current through the conductive winding associated therewith, pulses are generated in the individual conductors of the cable and are supplied to a suitable indicating means, such as a cathode ray tube, which displays the pulses on the screen thereof. If the conductor being tested is broken no pulse induced in the test conductor beyond the point of breakage can be transmitted back to the cathode ray tube. Consequently, the number of pulses appearing on the face of the cathode ray tube gives a precise indication of the section of the cable in which the break exists. If the controlled switching circuits are spaced two feet apart the location of the break is thus determined within a maximum tolerance of one foot.

In accordance with a feature of the invention, means are provided to synchronize the horizontal scan of the cathode ray tube with the saw-tooth waveform that is transmitted down the control connector of the testing circuit with the period of one horizontal scan across the cathode ray tube being equal to the period of one saw-tooth waveform supplied to the control lead of the testing circuit.

In accordance with another feature of the invention, a trigger, such as a Schmitt trigger circuit, is provided to be responsive to the horizontal deflection signal supplied to the cathode ray tube to cause said saw-tooth wave generator to terminate the generation of a given saw-tooth waveform and initiate the generation of a new saw-tooth waveform.

In accordance with another feature of the invention, a counter circuit is constructed to be responsive to the pulses generated in said conductors contained in said cable to produce a signal in response to a count indicating that no break exists on a given conductor. A stepping switch means is provided to respond to the output signal of said counter circuit to sequentially connect consecutive conductors of said cable to said cathode ray tube and to said counter circuit. In order to insure that the counter circuit will only count those pulses generated in a single conductor during any cycle, means are provided to reset the counter from the output of the Schmitt trigger circuit at the termination of each horizontal scanning signal.

The above-mentioned and other objects and features of the invention will be more fully understood from the following detailed description thereof when read in conjunction with the drawings:

FIG. 1 is a schematic sketch of the simplified version of the invention;

FIG. 1a is a waveform of the saw-tooth shaped signal supplied to the controlled switching circuits;

FIG. 2 is a schematic sketch of a more elaborate form of the invention; and

Figure 3:
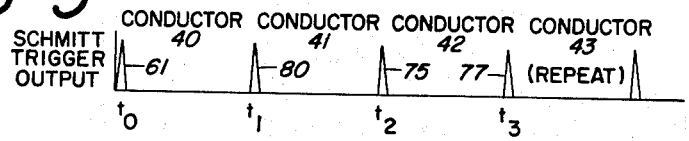

FIGS. 3 through 7, voltage waveforms at the various points in the circuit of FIG. 2.

It is to be understood that throughout the specification corresponding elements of different figures will be identified by the same reference characters, although primed in succeeding figures.

Referring to FIG. 1, there is shown a cable 10 having a plurality of inner conductors, such as conductor 11, which run the length of the cable 10. Two stages 12 and 13 of controlled switching circuit means are shown in FIG. 1. It is to be understood that such controlled switching circuit means are spaced at predetermined intervals along the length of coaxial cable 10; the spacing between such switching means being determined by the degree of tolerances desired in locating the point of breakage in one of the conductors, such as conductor 11. Although only two such switching circuits 12 and 13 are shown in FIG. 1, any number can be employed.

Each of the said controlled switching circuit means, such as circuit means 12, is comprised of a controlled switch 14, having an anode 15, a cathode 16, and a control electrode 17. The construction of this switch will be described in more detail later. At the present time it will suffice to note that switch 14 will be nonconductive, except during those periods of time that a signal is supplied to the control electrode 17. The switch 14 is connected in series with the current limiting resistor 18 and inductive coupling means 19 between positive voltage source 20 and ground potential. The capacitor 21 is connected in shunt across the switch 14 and the inductive coil 19.

In general, the operation of the structure is as follows. When the switch 14 is nonconductive, which is its normal condition, a positive charge is accumulated in capacitor 21 from the positive battery source 20 through conductor 65 which may be within the outer sheath of the cable 10. When a positive signal is supplied to the control electrode 17 the controlled switch 14 becomes conductive, thus permitting the charge in the capacitor 21 to discharge through the switch 14 and the inductive member 19 to ground potential. When the transient discharge current flows through the inductive element 19 a pulse is induced in all of the inner conductors contained within the cable 10. By means shown in detail in FIG. 2 each of these inner conductors will separately and consecutively be connected to the control electrode 22 of a cathode ray tube 23 and will appear as a pip, such as pip 24, on the screen of the cathode ray tube. Furthermore, each inner conductor is checked at each of the controlled switching circuits, such as circuits 12 and 13, which are caused to be energized in sequential order as they appear along the cable. Thus, there is produced a series of pulses or pips in the conductor being tested; which series of pips are time-spaced apart by an amount dependent upon the physical distance between the various switching circuits and which will be portrayed on the screen of the cathode ray tube 23 in the same manner as pip 24.

The means by which the various controlled switching circuits are triggered into conductivity is comprised of a potentiometer which consists of resistors, such as resistors 26 and 27, arranged in series along the length of the cable 10. Although in FIG. 1 these resistors, such as resistors 26 and 27, are represented as being outside the cable 10, in actual construction they can be inside the cable 10. A negative-going saw-tooth waveform, such as shown in FIG. 1a, is generated by the saw-tooth wave generator 28 and appears across a suitable load resistor 29. The potentiometer comprises resistors 26 and 27 and has one terminal thereof tapped into the load resistor 29 whereby the negative-going saw-tooth wave signal generated by generator 28 is supplied to the potentiometer mentioned above.

It will be observed that as the voltage of the saw-tooth wave signal of FIG. 1a becomes increasingly negative, the potential of the control electrode 17 of control circuit 12 will eventually reach a sufficient negative value to trigger the controlled switch 14 into conductivity, thus providing a discharge path for the capacitor 21 and producing a pulse in the conductor 11 by virtue of the discharge current flowing through the inductive coupling 19. At the same time, however, the voltage at the point 32, which is connected to the control electrode 33 of switch 34, is not of sufficient magnitude to trigger the switch 34 into conductivity. A short interval of time later, however, when the saw-tooth wave of FIG. 1a has become somewhat more negative, the potential of point 32 will be of sufficient negative magnitude to trigger the switch 34 to thereby produce a pulse in conductor 11 by virtue of the discharge of capacitor 35 through inductive coil 66. Similarly, succeeding controlled switch circuits, similar to circuits 12 and 13, spaced farther on down the cable 10 will be triggered into conductivity in sequential order to produce pulses on the conductor 11.

It is apparent that synchronization is needed between the negative-going saw-tooth triggering signal supplied to the lead 31 from generator 28 and the horizontal scanning signal supplied to the horizontal deflection coil 37 of the cathode ray tube 23. In order to insure such synchronism, the horizontal scanning signal is derived from the saw-tooth generator 28 in a manner that will be described later herein in the discussion of FIG. 2.

Although the circuit of FIG. 1 establishes the basic principle of the invention, it will be apparent that additional circuitry is needed in order to complete the structure. More specifically, for example, in order to obtain a usable picture on the screen of an oscilloscope, it is necessary that the screen be scanned several times so that the human eye can register the representation portrayed thereon. Furthermore, some means are required to successively test each of the said conductors contained in the cable 10, and still other means are provided to indicate the fact that a given conductor is open-circuited. Still further means are then required to prevent the selecting circuitry from passing on to another conductor after a break has been found. In other words, when it is determined that a given conductor contains a break, it is desired that the circuit discontinue its progressive testing of different conductors but rather continue testing the one conductor.

The structure shown in FIG. 2 is a more detailed schematic diagram of the invention and provides the additional circuitry required to meet the needs set forth in the previous paragraph.

Referring now to FIG. 2, there is shown a plurality of controlled switching circuits, such as switching circuits 12' and 13', which are spaced along the cable 10' to be tested in the same manner as was described in connection with FIG. 1. The inner conductors of the cable, such as inner conductors 40, 41, 42, and 43, extend to some termination circuitry, such as a monitoring means, for example, which is not shown. Connected to each of the inner conductors, such as conductors 40 through 43, are conductors 44, 45, 46, and 47, respectively. The conductors 44 through 47 are connected to the contacts 48, 49, 50, and 51, respectively, of the stepping switch 54. The stepping switch 54 has a stepping arm 52 and further comprises internal circuitry of conventional design (not shown in detail) which is constructed to respond to pulses on input lead 53 to cause the stepping switch arm 52 to contact, successively, the contacts, such as contacts 48 through 51, of the stepping switch.

In general, the operation of the circuit of FIG. 2 is as follows. A negative saw-tooth wave is generated in generator 28' and is supplied to the control lead 31', which functions to induce a supply of pulses in each of the conductors within the cable 10' in the manner described in conjunction with FIG. 1. However, at any given time, only one inner conductor is connected to the control grid 22' of the cathode ray tube 23'. As shown in the structure of FIG. 2 such conductor is inner conductor 40, which is connected to said control grid 22' through lead 44, contact 48 of switching circuit 54, contact arm 52 and lead 55. The pulses generated in inner conductor 40 are also connected to counter circuit 57 through lead 56.

Since it is known how many pulses should be generated if no break exists in the conductor 40, the counter circuit 57 can be preset to produce an output pulse on lead 58 when the continuity of the inner conductor proves to be all right. Such output pulse appearing on lead 58 is supplied to stepping switch 54 via lead 53 to step the arm 52 to the next succeeding contact 49, thus connecting the inner conductor 41 to the cathode ray tube control grid 22'. Schmitt trigger circuit 54 is provided to respond to a predetermined amplitude of the sawtooth deflection signal supplied to the horizontal deflection coil 37' to perform two functions. The first function is to cause the saw-tooth wave generator 28' to recycle, i.e., to terminate the saw-tooth waveform that it had been generating and to begin the generation of a new saw-tooth waveform. The second function of the output signal of the Schmitt trigger circuit is to reset the counter circuit 57 so that said counter circuit will be properly conditioned to count pulses generated in the next inner conductor of cable 10 to be tested.

It will be observed that if there is a break in any inner conductors the counter circuit will not complete the necessary predetermined count to produce an output signal on conductor 58. Thus, the stepping arm 52 will not step and the conductor with a break therein will be tested repeatedly until the equipment is turned off. The switch 59 is a manual switch which can be opened by the operator to permit the checking of any particular inner conductor desired. In effect, the opening of the switch 59 disconnects the counter circuit 54 from the apparatus.

Figure 4:
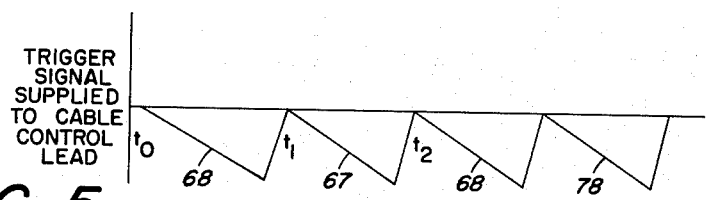
Figure 5:
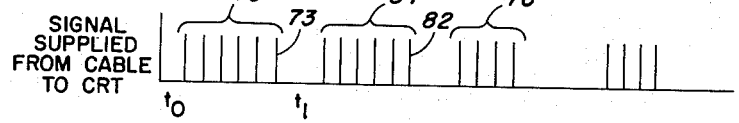
Figure 6:
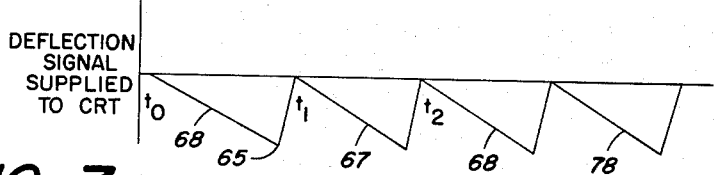

Referring now to FIGS. 3 through 7, there are shown waveforms which describe in more detail the operation of the circuit 52 and, more particularly, the time relationship between the signals generated in various pulses of the circuit. The abscissas of FIGS. 3 through 7 all represent time and have the same unit scale. FIG. 3 represents the output of the Schmitt trigger circuit which, as can be seen, is a series of pulses. When the power is initially turned on the schmitt trigger circuit is energized to produce the first pulse 61 which functions to reset the counter circuit 57 and also to cause the saw-tooth wave generator 28' of FIG. 1 to generate a saw-tooth waveform across the load impedance 29'. A first tap 30' taps off a portion of the saw-tooth waveform as represented by the curve of FIG. 4. Such saw-tooth waveform is applied to the testing line 31. A second tap 62 functions to supply the saw-tooth waveform to the horizontal deflection coil 37' of cathode ray tube 23'. Such saw-tooth waveform is represented by the waveform of FIG. 6. The waveform of FIG. 6 will cause the electron beam of the cathode ray tube to scan the screen 63. However, when the deflected signal reaches a predetermined peak 65, the Schmitt trigger circuit 54 is triggered thereby to produce another output pulse 80, as shown in FIG. 3. Such pulse 80 will function to reset the counter circuit 57 and cause the saw-tooth generator 28' to initiate the generation of a second saw-tooth wave signal 67, as shown in FIGS. 4 and 6. Thus, it can be seen that the time interval of the single scan of the cathode ray tube is determined by the response of the Schmitt trigger circuit to the amplitude of the horizontal scanning signal and represents an interval of time $t_0-t_1$. During this interval of time $t_0-t_1$ saw-tooth waveform 68 of FIG. 4 must traverse the cable 10' and the pulses induced in the inner conductor thereof must be transmitted back to the cathode ray tube. Such pulses induced in the inner conductor of cable 10 are represented by the curve of FIG. 5. For purposes of illustration, six pulses are represented for each saw-tooth waveform. Such six pulses would represent six controlled switching circuits such as 12' and 13' spaced along the cable. It will be observed that all six pulses of any one group of pulses, such as group 70, as shown in FIG. 5, occur during the negative-going portion of the saw-tooth waveform. This is necessary in order that the pulses may show up the screen of the oscilloscope as represented by the pulses 71 on said screen 63 of FIG. 2.

Figure 7:
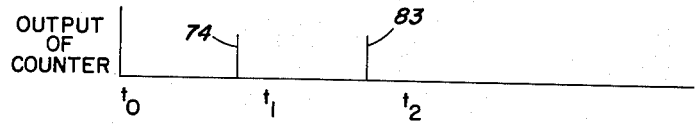

As discussed before, between the times $t_0$ and $t_1$ the conductor 40 is being tested. However, the last pulse 73 of the group of pulses 70 causes the counter circuit 57 of FIG. 2 to produce an output pulse 74 of FIG. 7 on output conductor 58 of FIG. 1. Such output pulse 74 functions to cause the stepping switch arm 52 to advance one contact to the contact 49. Thus, during the second scanning of the C.R.T. screen 63, that is between the times $t_1$ and $t_2$, the conductor 41 is tested. The last pulse 82 of the group of six pulses 84 of FIG. 5 will cause the counter to produce an output pulse which will, in turn, advance the arm 52 of switch 24 to contact 50 in preparation for checking conductor 42. At time $t_2$ the Schmitt trigger circuit produces another pulse 75 which resets the counter circuit 57 and causes the generator 28' to initiate the generation of another sawtooth waveform 68, as shown in FIGS. 5 and 7. Assume, however, that conductor 42 has a break therein between the fourth and the fifth controlled switching circuits. Consequently, only four pulses, as shown by the group of pulses 76 of FIG. 5 will be generated in conductor 42 and supplied back to the cathode ray tube 23', and to the counter circuit 57. Consequently, the counter circuit 57 will not produce an output signal on its output lead 58 since it will not count to the predetermined rate of six. However, the Schmitt circuit 54 will still respond to the maximum peak of the horizontal scanning voltage to produce a fourth pulse 77 at time $t_3$ which will cause the generator 28' to begin another saw-tooth waveform 78. But, since only four pulses from the conductor being tested are being supplied to the counter 57 for each cycle, no output pulse will be supplied to the stepping switch 54 from said counter. Thus, the conductor 42 will be tested repeatedly and the observer will be able to view the number of pulses on the screen and will be able to determine the location of the point of breakage within the predetermined tolerances.

A specific controlled switch suitable for use in this invention is manufactured by Solid State Products, Inc. of Salem, Massachusetts and is described in their bulletin D420-02-12-59 on pages 10 and 11.

It is to be noted that the forms of the invention herein shown and described are but preferred embodiments thereof and that various changes may be made in the circuit arrangement thereof without departing from the spirit or the scope of the invention.

We claim:

1. Means for locating a fault in a cable comprising a plurality of controlled switching means positioned at spaced intervals along the length of said cable, battery source means common to all of said controlled switching means, voltage divider means having a plurality of taps successively arranged along said voltage divider means, generating means for generating a substantially saw-tooth shaped voltage signal and impressing said voltage signal across said voltage divider means, each of said controlled switching means comprising a circuit means including a series combination of a controlled switch and an inductive means inductively coupled to said cable, each of said circuit means being connected across said common battery source, each of said controlled switches comprising a control electrode connected to a separate tap of said voltage divider means, the control electrodes of the controlled switches successively positioned along said cable being connected to successive taps on said voltage divider means, the control electrodes of each of said controlled switches responsive to the increasingly attenuated saw-tooth shaped voltage signal occurring at said successive taps along said voltage divider means to cause the said controlled switches to become conductive in the successive order in which they are positioned along said cable, each of said controlled switches, when conductive, arranged to cause a current flow through the said inductive means connected in series therewith to induce pulses in the conductors of said cable, and indicating means connected to a given conductor in said cable and comprising means for determining the number of pulses generated in said given conductor due to the conduction of said controlled switches to indicate the location of a break in said given conductor.

2. Means for locating a cable fault in accordance with claim 1 in which each of said circuit means comprises a resistor connected in series with said controlled switch and said inductive means with respect to said battery source.

3. Means for locating a cable fault in accordance with claim 2 comprising a capacitor connected in parallel with said series combination of said controlled switch and said inductive means.

4. Means for locating a cable fault in accordance with claim 3, in which said indicating means comprises a cathode ray tube having a control grid and an electron beam deflecting means, means for supplying said saw-tooth wave voltage to said electron beam deflecting means, and means for supplying the pulses generated in said given conductor to said control grid of said cathode ray tube.

5. Means for locating a cable fault in accordance with claim 1 in which said cable comprises a plurality of conductors, means for selectively and sequentially connecting said conductors of said cable to said indicating means, counting means comprising reset means and constructed to count the pulses generated in the selected conductor during a given saw-tooth shaped signal, and means responsive to a given voltage level of said saw-tooth voltage to reset said counting means and to recycle said generating means.

6. Means for locating a cable fault in accordance with claim 5 in which each of said circuit means comprises a resistor connected in series with said controlled switch and said inductive means with respect to said battery source.

7. Means for locating a cable fault in accordance with claim 6 comprising a capacitor connected in parallel with said series combination of said controlled switch and said inductive means.

8. Means for locating a cable fault in accordance with claim 7 in which said indicating means comprises a cathode ray tube having a control grid and an electron beam deflecting means, means for supplying said saw-tooth wave voltage to said electron beam deflecting means, and means for supplying the pulses generated in the selected conductor to said control grid of said cathode ray tube.

References Cited in the file of this patent

UNITED STATES PATENTS 2,838,604  Hoth _____ June 10, 1958